(12) United States Patent
Biyani

(10) Patent No.: US 10,021,872 B2
(45) Date of Patent: Jul. 17, 2018

(54) COMBINATION DUSTER AND SPRAYER DEVICE

(71) Applicant: Ashok Biyani, Slyvanie, OH (US)

(72) Inventor: Ashok Biyani, Slyvanie, OH (US)

( * ) Notice: Subject to any disclaimer, the term of this patent is extended or adjusted under 35 U.S.C. 154(b) by 336 days.

(21) Appl. No.: 14/926,806

(22) Filed: Oct. 29, 2015

(65) Prior Publication Data

US 2017/0118973 A1 May 4, 2017

(51) Int. Cl.
| | |
|---|---|
| *A01M 3/00* | (2006.01) |
| *A01M 3/02* | (2006.01) |
| *A01M 7/00* | (2006.01) |
| *B25G 1/04* | (2006.01) |
| *B25G 3/36* | (2006.01) |
| *B25G 1/10* | (2006.01) |
| *B08B 1/00* | (2006.01) |
| *A46B 5/02* | (2006.01) |

(52) U.S. Cl.
CPC ............. *A01M 7/006* (2013.01); *A01M 3/00* (2013.01); *A01M 3/02* (2013.01); *A01M 7/00* (2013.01); *A46B 5/02* (2013.01); *B08B 1/002* (2013.01); *B25G 1/04* (2013.01); *B25G 1/102* (2013.01); *B25G 3/36* (2013.01); *A01M 2200/01* (2013.01); *A46B 2200/3026* (2013.01)

(58) Field of Classification Search
CPC .......... A01M 3/00; A01M 3/02; A01M 3/027; A01M 7/00; A01M 7/0003; A01M 7/0007; A01M 7/001; A01M 7/0025; A01M 7/0032; A01M 7/0046
USPC ......... 43/133, 134, 137, 900; 15/1, 104.001, 15/106, 107, 105; 222/174, 192; 239/289; 401/268, 269, 272, 274, 284, 401/286, 287, 190, 196; 132/290
See application file for complete search history.

(56) References Cited

U.S. PATENT DOCUMENTS

| | | | | |
|---|---|---|---|---|
| 454,117 | A * | 6/1891 | Myers | A01M 21/043 |
| | | | | 239/154 |
| 1,004,936 | A * | 10/1911 | Terzian | A46B 11/0013 |
| | | | | 401/279 |
| 1,319,669 | A * | 10/1919 | Muller | A46B 11/0013 |
| | | | | 30/41 |
| 2,764,772 | A * | 10/1956 | Staskowski | A46B 11/0017 |
| | | | | 132/290 |

(Continued)

FOREIGN PATENT DOCUMENTS

| | | | |
|---|---|---|---|
| DE | 10223447 A1 * | 12/2003 | A01M 3/00 |
| JP | 2000004757 A * | 1/2000 | |
| JP | 2003310130 A * | 11/2003 | |

*Primary Examiner* — Darren W Ark

(57) ABSTRACT

A combination duster and sprayer device for both cleaning and spraying insecticide includes a housing that is tubular and has a bottom. The housing has a top that is open defining a rim, such that the housing is configured for insertion of an aerosol can. A coupler is coupled to the bottom, such that the coupler is configured to engage a complimentary connector of an extension device. A casing that has an open end is complimentary to the housing, such that the housing is insertable into the casing. The housing is frictionally couplable to the casing. A plurality of bristles is coupled to and extends outwardly from the casing. The bristles are pliable. An opening is positioned in a closed end of the casing. An actuator is insertable into the opening and configured to engage the nozzle of an aerosol can to direct spray to the area selected by the user.

17 Claims, 4 Drawing Sheets

(56) References Cited

U.S. PATENT DOCUMENTS

| | | | | |
|---|---|---|---|---|
| 3,184,781 A | * | 5/1965 | Hoxie | A47L 11/325 401/190 |
| 3,228,057 A | * | 1/1966 | Parrish | A46B 11/0017 132/290 |
| 3,231,923 A | * | 2/1966 | Gaines | A46B 11/0017 132/290 |
| 3,351,418 A | * | 11/1967 | Karnuth | A46B 11/0017 132/290 |
| 3,387,911 A | * | 6/1968 | Focht | A46B 11/0017 401/190 |
| 3,388,958 A | * | 6/1968 | Johnson | A45D 27/04 132/290 |
| 3,457,928 A | * | 7/1969 | Kurshenoff | A45D 24/26 132/113 |
| 3,516,424 A | * | 6/1970 | Eagle | A46B 11/0017 132/148 |
| 3,653,090 A | * | 4/1972 | Weaver | A46B 11/0017 132/290 |
| 3,981,597 A | * | 9/1976 | Cohn | A46B 11/0017 222/190 |
| 4,057,353 A | * | 11/1977 | Kitatani | A47L 13/26 401/204 |
| 4,120,115 A | * | 10/1978 | Mushkin | A01M 3/02 15/207 |
| 4,213,423 A | * | 7/1980 | Bryan | A01K 13/003 119/605 |
| 4,252,455 A | * | 2/1981 | de la Pena | A46B 11/0017 222/402.13 |
| 4,413,756 A | * | 11/1983 | Kirley | B65D 83/205 222/402.11 |
| 4,599,823 A | * | 7/1986 | Lee | A01K 13/002 119/626 |
| 4,603,992 A | * | 8/1986 | Kavoussi | A46B 11/0017 222/213 |
| 4,625,402 A | * | 12/1986 | Kavoussi | B26B 21/446 222/192 |
| 4,694,605 A | * | 9/1987 | Garcia | A01M 3/02 43/137 |
| 4,794,663 A | | 1/1989 | Vosbikian | |
| 4,958,596 A | * | 9/1990 | Belan | A01K 13/001 119/603 |
| 4,971,471 A | * | 11/1990 | Sloan | A47L 13/20 15/210.1 |
| RE33,860 E | * | 3/1992 | Chen | A46B 11/0017 222/391 |
| 5,115,765 A | * | 5/1992 | El Omary | A01K 13/002 119/606 |
| 5,279,256 A | * | 1/1994 | Brite | A01K 13/001 119/604 |
| 5,307,959 A | * | 5/1994 | Bedore | B65D 83/203 222/174 |
| 5,309,669 A | * | 5/1994 | Jackson | A01M 1/245 43/124 |
| 5,365,880 A | * | 11/1994 | South | A01K 13/002 119/602 |
| 5,419,077 A | * | 5/1995 | Tombarelli | A01M 1/2038 239/121 |
| 5,425,589 A | * | 6/1995 | Griffin | A47L 1/08 239/289 |
| 5,537,777 A | * | 7/1996 | Geeting | A01M 3/00 15/119.1 |
| D382,326 S | * | 8/1997 | Geeting | D22/122 |
| 5,682,636 A | * | 11/1997 | Agustin | A47L 25/00 15/22.1 |
| 5,692,846 A | * | 12/1997 | Schwarzberg | A47L 23/05 401/190 |
| 6,003,523 A | * | 12/1999 | Nettlefold | B65D 83/285 132/289 |
| 6,161,328 A | * | 12/2000 | Sing | A01M 3/02 15/160 |
| 6,205,702 B1 | * | 3/2001 | Ammons | A01M 1/2038 43/124 |
| 6,244,771 B1 | * | 6/2001 | Bruggeman | A47L 1/15 15/147.2 |
| 6,269,821 B1 | * | 8/2001 | Berke | A45D 34/04 132/317 |
| 6,364,557 B1 | * | 4/2002 | Dougherty | A46B 11/0041 401/183 |
| 6,475,587 B1 | | 11/2002 | O'Neill | |
| 6,574,915 B1 | * | 6/2003 | Allen | A01M 3/00 294/99.1 |
| 6,581,326 B1 | * | 6/2003 | Smith | A01M 1/2038 43/124 |
| 6,604,318 B1 | * | 8/2003 | Cassidy | A01M 1/245 43/132.1 |
| 6,672,313 B2 | * | 1/2004 | Battaglia | A46B 11/0017 132/112 |
| 6,688,036 B1 | * | 2/2004 | Gunn | A01M 13/003 43/125 |
| 6,808,717 B1 | * | 10/2004 | Bale | A01N 25/06 424/405 |
| 7,076,916 B2 | * | 7/2006 | Bianchini | A01M 1/2038 222/174 |
| 7,478,453 B1 | * | 1/2009 | Busshaus | A47L 13/38 15/144.3 |
| 7,484,260 B2 | * | 2/2009 | Jaffe | A46B 11/0013 15/21.1 |
| 7,717,300 B1 | * | 5/2010 | Yarrusso, Jr. | A01M 1/2038 222/174 |
| 8,029,206 B2 | * | 10/2011 | McCarthy | B65D 83/208 222/174 |
| 8,123,761 B2 | * | 2/2012 | Herweijer | A61B 17/50 606/131 |
| 8,366,722 B2 | * | 2/2013 | Herweijer | A61B 17/50 606/131 |
| D685,152 S | * | 6/2013 | Smith | D32/40 |
| 8,641,309 B2 | * | 2/2014 | Perry | A47L 13/26 401/137 |
| 8,714,858 B2 | * | 5/2014 | Screnci, Jr. | A45D 27/04 401/282 |
| 8,844,193 B2 | * | 9/2014 | Luongo | A01M 1/2094 43/132.1 |
| 9,380,774 B2 | * | 7/2016 | Gellani | A01M 13/003 |
| 9,648,862 B1 | * | 5/2017 | Lievano | A01M 7/005 |
| 2003/0081983 A1 | * | 5/2003 | Waddell | A46B 11/063 401/286 |
| 2006/0276730 A1 | * | 12/2006 | Thiebaut | A61H 7/003 601/112 |
| 2007/0098485 A1 | * | 5/2007 | Byun | A45D 33/02 401/286 |
| 2009/0026223 A1 | * | 1/2009 | Knebler | B65D 83/202 222/174 |
| 2010/0037511 A1 | * | 2/2010 | Schier | A01M 3/02 43/137 |
| 2011/0027004 A1 | * | 2/2011 | Ko | A46B 11/0041 401/268 |
| 2012/0186735 A1 | | 7/2012 | Hassman | |
| 2015/0003884 A1 | * | 1/2015 | Kast | A01M 7/0046 401/4 |
| 2015/0136174 A1 | * | 5/2015 | Paro | A47L 13/26 134/6 |

\* cited by examiner

COMBINATION DUSTER AND SPRAYER DEVICE

BACKGROUND OF THE DISCLOSURE

Field of the Disclosure

The disclosure relates to duster devices and sprayer devices and more particularly pertains to a new combination duster and sprayer device for both cleaning and spraying insecticide.

SUMMARY OF THE DISCLOSURE

An embodiment of the disclosure meets the needs presented above by generally comprising a housing that is tubular and has a bottom. The housing has a top that is open defining a rim, such that the housing is configured for insertion of an aerosol can. A coupler is coupled to the bottom, such that the coupler is configured to engage a complimentary connector of an extension device. A casing that has an open end is complimentary to the housing, such that the housing is insertable into the casing. The housing is frictionally couplable to the casing. A plurality of bristles is coupled to and extends outwardly from the casing. The bristles are pliable. An opening is positioned in a closed end of the casing. An actuator is insertable into the opening and configured to engage the nozzle of an aerosol can to direct spray to the area selected by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
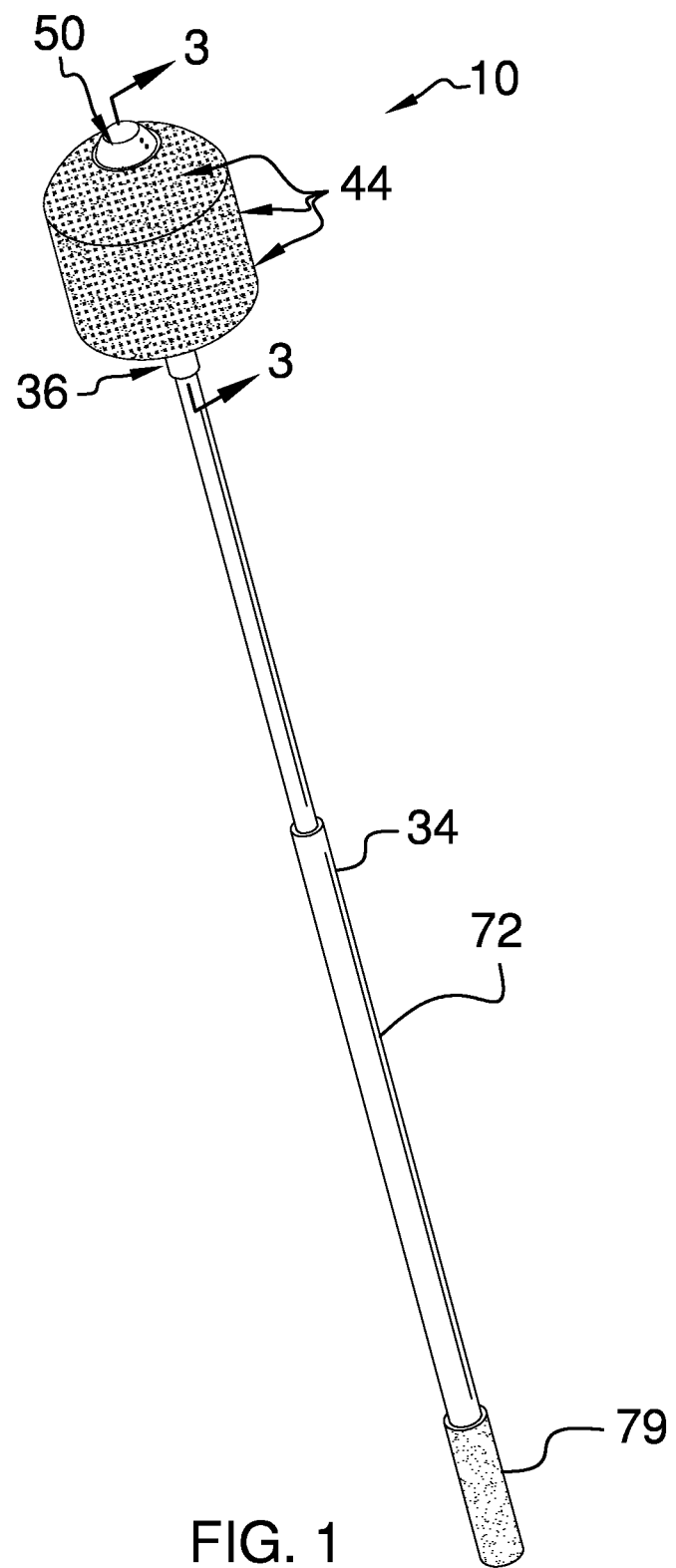
FIG. 1 is an isometric perspective view of a combination duster and sprayer device according to an embodiment of the disclosure.
Figure 2:
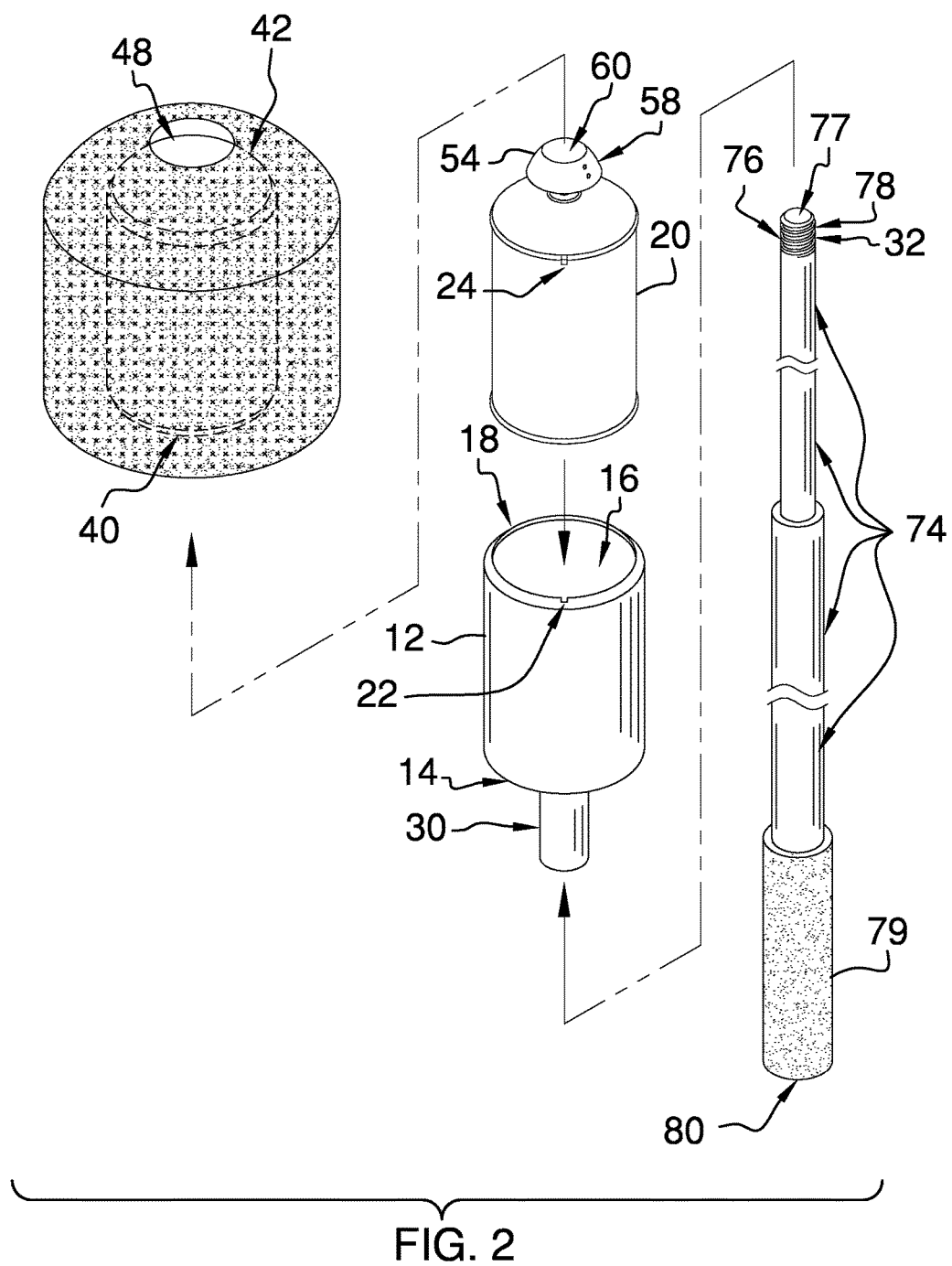
FIG. 2 is an exploded view of an embodiment of the disclosure.
Figure 3:
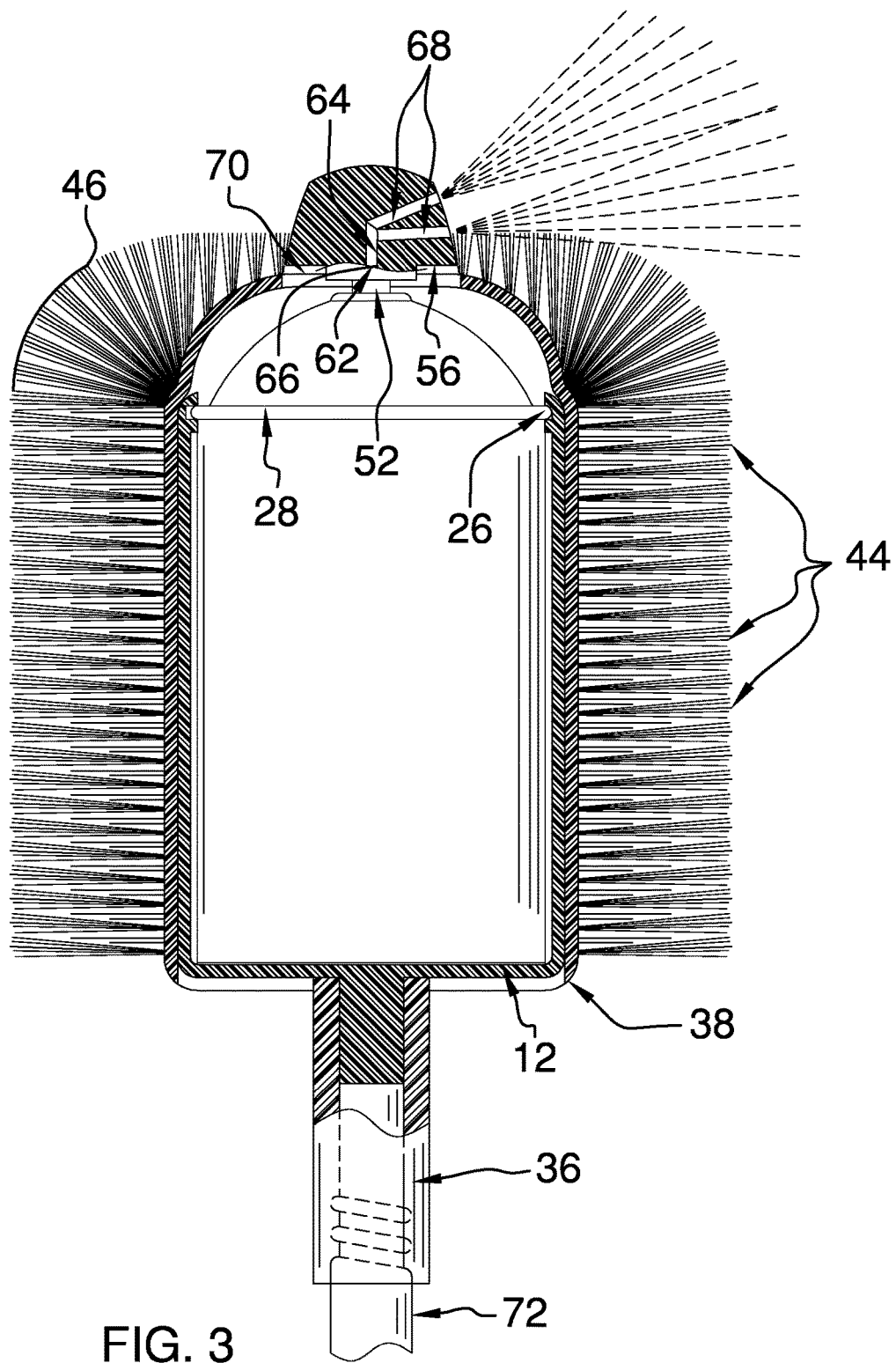
FIG. 3 is a cross-sectional view of an embodiment of the disclosure.
Figure 4:
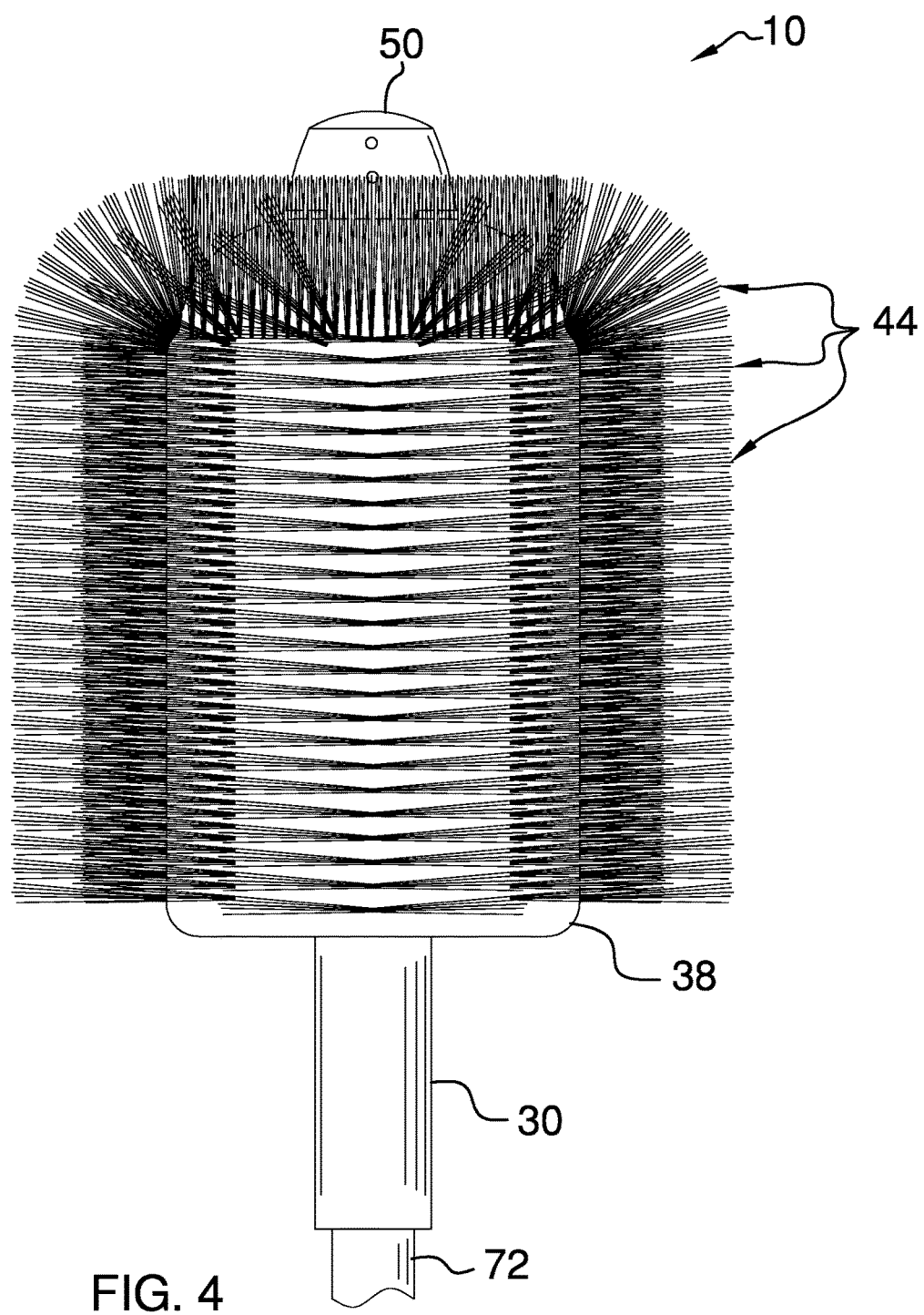
FIG. 4 is a side view of an embodiment of the disclosure.

With reference now to the drawings, and in particular to FIGS. 1 through 4 thereof, a new combination duster and sprayer device embodying the principles and concepts of an embodiment of the disclosure and generally designated by the reference numeral 10 will be described.

As best illustrated in FIGS. 1 through 4, the combination duster and sprayer device 10 generally comprises a housing 12 that is tubular and has a bottom 14. The housing 12 has a top 16 that is open defining a rim 18, such that the housing 12 is configured for insertion of an aerosol can 20. A notch 22 positioned in the rim 18 is configured to engage a complimentary tab 24 positioned proximate to the top of the aerosol can 20. The rim 18 comprises an annular grove 26 that is deformable and configured to engage a perimeter lip 28 of the aerosol 20 can to secure the aerosol can 20 in the housing 12. A coupler 30 is coupled to the bottom 14 and configured to engage a complimentary connector 32 of an extension device 34. Preferably, the coupler 30 comprises a threaded socket 36.

The device 10 comprises a casing 38 that is complimentary to the housing 12, such that the housing 12 is insertable into an open end 40 of the casing 38. The housing 12 is frictionally coupled to the casing 38. The casing 38 is tubular and has a closed end 42 that is cross-sectionally arcuate. A plurality of bristles 44 is coupled to and extends outwardly from the casing 38. The bristles 44 are pliable and define an outer boundary 46 that is complimentary to the casing 38.

An opening 48 is positioned in the closed end 42 of the casing 38. An actuator 50 is insertable into the opening 48 and configured to engage the nozzle 52 of the aerosol can 20 to direct spray to the area selected by the user. More specifically, the actuator 50 comprises a base 54 that has a lower face 56, which is circular. The base 54 has a side 58 that extends upwardly from the lower face 56. The side 58 is annular and slanted. The base 54 has an upper face 60 that extends upwardly from the side 58. The upper face 60 is rounded. A stem 62, complimentary to the opening 48 in the casing 38, is positioned on the lower face 56. The stem 62 has a penetration 64 that is centrally positioned in the stem 62 and extends into the base 54. The penetration 64 is circumferentially larger proximate to a lower end 66. The lower end 66 is configured for partial insertion of the nozzle 52 into the penetration 64, such that the nozzle 52 is frictionally coupled to the stem 62. A plurality of channels 68 is positioned in the base 54. The channels 68 extend from the penetration 64 to the side 58 of the base 54 and allow spray from the aerosol can 20 to pass from the penetration 64 through the channels 68 to the area selected by the user. Preferably, the plurality of channels 68 comprises two channels 68. The stem 62 is configured to couple to the nozzle 52 of the aerosol can 20 such that the undepressed nozzle 52 and the stem 62 together generate a gap 70 between the lower face 56 of the base 54 and the closed end 42 of the casing 38. The actuator 50 is positioned for depression by the user, which closes the gap 70 and activates the nozzle 52. Preferably, the actuator 50 extends past the bristles 44.

The device 10 comprises a rod 72, which is comprised of a plurality of nested sections 74, such that the rod 72 is telescopic. Preferably, the plurality of nested sections 74 comprises two sections 74. A connector 76 is coupled to a first terminus 77 of the rod 72. The connector 76 is complementary to the coupler 30 and preferably comprises a male threaded connector 78. A grip 79, preferably pliable, is coupled to a second terminus 80 of the rod 72.

In use, the aerosol can 20 is inserted into the housing 12 and the housing 12 then is inserted into the casing 38. The actuator 50 is configured to couple to the nozzle 52 of the aerosol can 20 through the opening 48 in the closed end 42 of the casing 38. The user then can use the coupler 30 on the housing 12 to connect to the connector 76 of the rod 72. The plurality of nested sections 74 is extendable by the user to position the plurality of bristles 44 in an area requiring cleaning or removal of cobwebs. The actuator 50 is configured for depression by the user against a ceiling or other surface, closing the gap 70 between the base 54 and the closed end 42 of the casing 38 and activating the nozzle 52. The insecticide contained in the aerosol can 20 is emitted to kill insects in the area desired by the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination duster and sprayer device comprising:
   a housing, said housing being tubular, said housing having a bottom, said housing having a top, said top being open defining a rim, such that said housing is configured for insertion of an aerosol can;
   a coupler, said coupler being coupled to said bottom, such that said coupler is configured to engage an extension device;
   a casing, said casing being complimentary to said housing, such that said housing is insertable into an open end of said casing, such that said housing is frictionally coupled to said casing;
   a plurality of bristles, said bristles being coupled to and extending outwardly from said casing, said bristles being pliable;
   an opening, said opening being positioned in a closed end of said casing;
   an actuator, said actuator being insertable into said opening and configured to engage a nozzle of the aerosol can to direct spray to an area selected by a user; and
   wherein said housing is configured for insertion of the aerosol can, such that said housing and the aerosol can are configured for insertion into said casing, wherein said actuator is configured to couple to the nozzle of the aerosol can, such that said plurality of bristles are positionable by the user in an area requiring cleaning or removal of cobwebs, wherein said actuator is configured for depression by the user against a ceiling, such that insecticide contained in the aerosol can is emitted to kill insects in the area selected by the user.

2. The device of claim 1, further including a notch, said notch being positioned in said rim, such that said notch is configured to engage a complimentary tab positioned on the aerosol can proximate to a top of the aerosol can.

3. The device of claim 1, further including said rim comprising an annular groove, said annular groove being deformable, such that said annular groove is configured to engage a perimeter lip of the aerosol can to secure the aerosol can in the housing.

4. The device of claim 1, further including said coupler comprising a threaded socket.

5. The device of claim 1, further including said casing being tubular.

6. The device of claim 1, further including said closed end being cross-sectionally arcuate.

7. The device of claim 1, further including said bristles defining an outer boundary, said outer boundary being complimentary to said casing.

8. The device of claim 1, further including said actuator comprising:
   a base, said base having a lower face, said base having a side extending upwardly from said lower face;
   said base having an upper face extending upwardly from said side;
   a stem, said stem being positioned on said lower face, said stem being complimentary to said opening in said casing;
   a penetration, said penetration being centrally positioned in said stem and extending into said base, said penetration being configured for partial insertion of the nozzle of the aerosol can into said penetration and such that the nozzle is frictionally coupled to said stem;
   a plurality of channels, said channels being positioned in said base, said channels extending from said penetration to said side of said base, such that said channels are positioned to allow spray from the aerosol can to pass from said penetration through said channels to the area selected by the user; and
   wherein said stem is configured to couple to the nozzle of the aerosol can such that the nozzle when not being pressed and said stem together form a gap between said lower face of said base and said closed end of said casing, and wherein said actuator is positioned for depression by the user such that said gap is closed and the nozzle of the aerosol can is activated.

9. The device of claim 8, further comprising:
   said lower face being circular;
   said side being annular and slanted; and
   said upper face being rounded.

10. The device of claim 8, further including said plurality of channels comprising two channels.

11. The device of claim 1, further including said actuator extending past said bristles.

12. The device of claim 1, further including said extension device being a rod, said rod comprising a plurality of nested sections, such that said rod is telescopic.

13. The device of claim 12, further including said plurality of nested sections comprising two sections.

14. The device of claim 12, further including a complimentary connector of said extension device being coupled to a first terminus of said rod.

15. The device of claim 14, further including a grip, said grip being coupled to a second terminus of said rod.

16. The device of claim 15, further including said grip being pliable.

17. A combination duster and sprayer device comprising:
   a housing, said housing being tubular, said housing having a bottom, said housing having a top, said top being open defining a rim, such that said housing is configured for insertion of an aerosol can;

a notch, said notch being positioned in said rim, such that said notch is configured to engage a complimentary tab positioned on the aerosol can proximate to a top of the aerosol can;

said rim comprising an annular groove, said annular groove being deformable, such that said annular groove is configured to engage a perimeter lip of the aerosol can to secure the aerosol can in the housing;

a coupler, said coupler being coupled to said bottom, said coupler comprising a threaded socket;

a casing, said casing being complimentary to said housing, such that said housing is insertable into an open end of said casing, such that said housing is frictionally coupled to said casing, said casing being tubular, said casing having a closed end, said closed end being cross-sectionally arcuate;

a plurality of bristles, said bristles being coupled to and extending outwardly from said casing, said bristles being pliable, said bristles defining an outer boundary, said outer boundary being complimentary to said casing;

an opening, said opening being positioned in said closed end of said casing;

an actuator, said actuator being insertable into said opening and configured to engage a nozzle of the aerosol can to direct spray to the area selected by the user;

said actuator comprising:
- a base, said base having a lower face, said lower face being circular, said base having a side extending upwardly from said lower face, said side being annular and slanted, said base having an upper face extending upwardly from said side, said upper face being rounded,
- a stem, said stem being positioned on said lower face, said stem being complimentary to said opening in said casing,
- a penetration, said penetration being centrally positioned in said stem and extending into said base, said penetration being configured for partial insertion of the nozzle of the aerosol can into said penetration and such that the nozzle is frictionally coupled to said stem,
- a plurality of channels, said channels being positioned in said base, said channels extending from said penetration to said side of said base, such that said channels are positioned to allow spray from the aerosol can to pass from said penetration through said channels to the area selected by the user, said plurality of channels comprising two channels, and
- wherein said stem is configured to couple to the nozzle of the aerosol can such that the nozzle of the aerosol can when not being pressed and said stem together form a gap between said lower face of said base and said closed end of said casing, and wherein said actuator is positioned for depression by the user such that said gap is closed and the nozzle of the aerosol can is activated;

said actuator extending past said bristles;

an extension device being removably coupled to said housing, said extension device comprising
- a rod, said rod comprising a plurality of nested sections, such that said rod is telescopic, said plurality of nested sections comprising two sections,
- a connector, said connector being coupled to a first terminus of said rod, said connector being complementary to said coupler, said connector comprising a male threaded connector wherein said rod is threadably coupled to said coupler, and
- a grip, said grip being coupled to a second terminus of said rod, said grip being pliable;

wherein said housing is configured for insertion of the aerosol can, such that said housing and the aerosol can are configured for insertion into said casing, wherein said actuator is configured to couple to the nozzle of the aerosol can, such that said coupler is positioned to couple with said connector of said rod, wherein said plurality of nested sections are configured for extension by the user, such that said plurality of bristles are positionable by the user in an area requiring cleaning or removal of cobwebs, wherein said actuator is configured for depression by the user against a ceiling or other surface, such that insecticide contained in the aerosol can is emitted to kill insects in the area selected by the user.

* * * * *